UNITED STATES PATENT OFFICE.

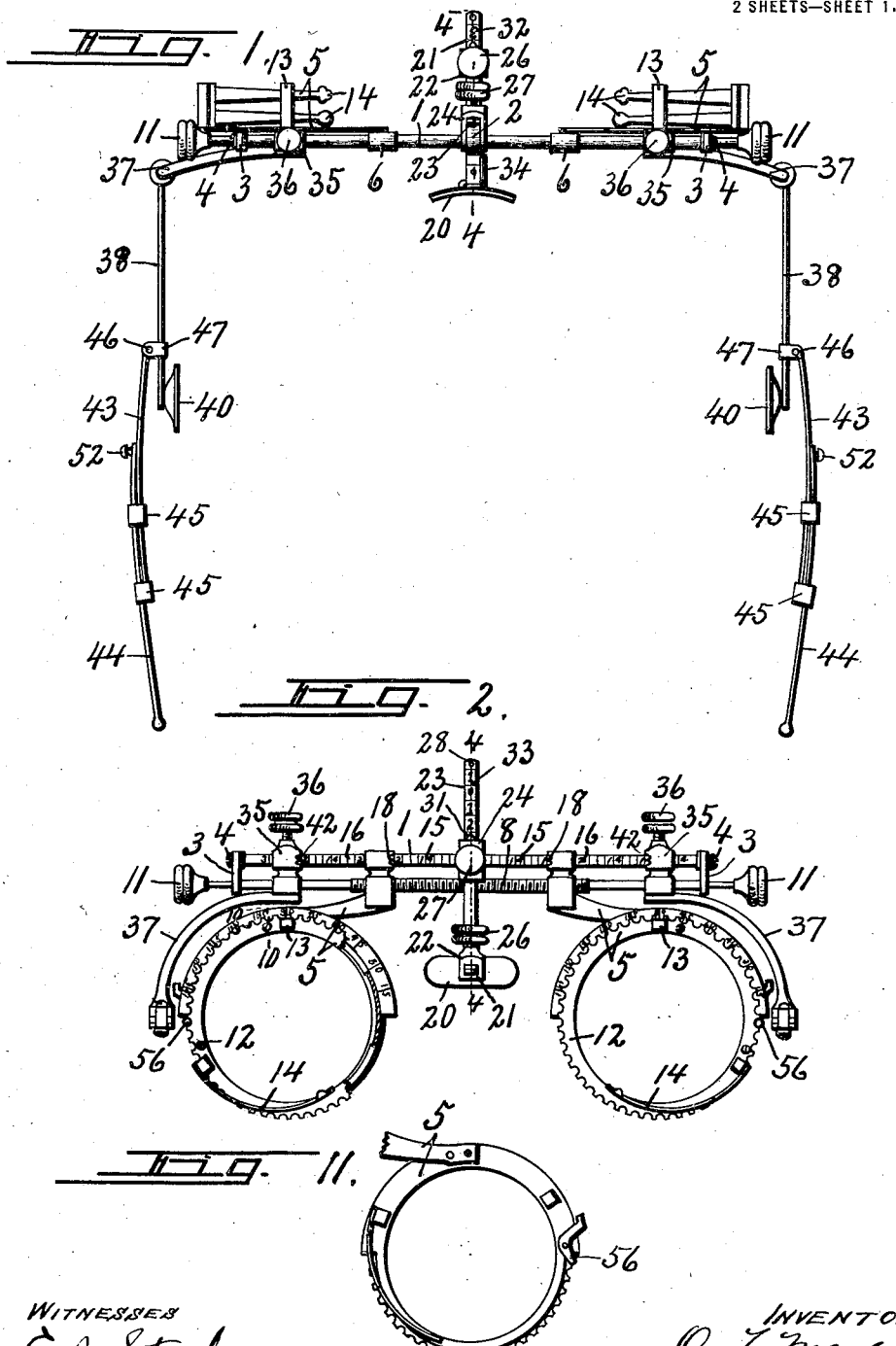

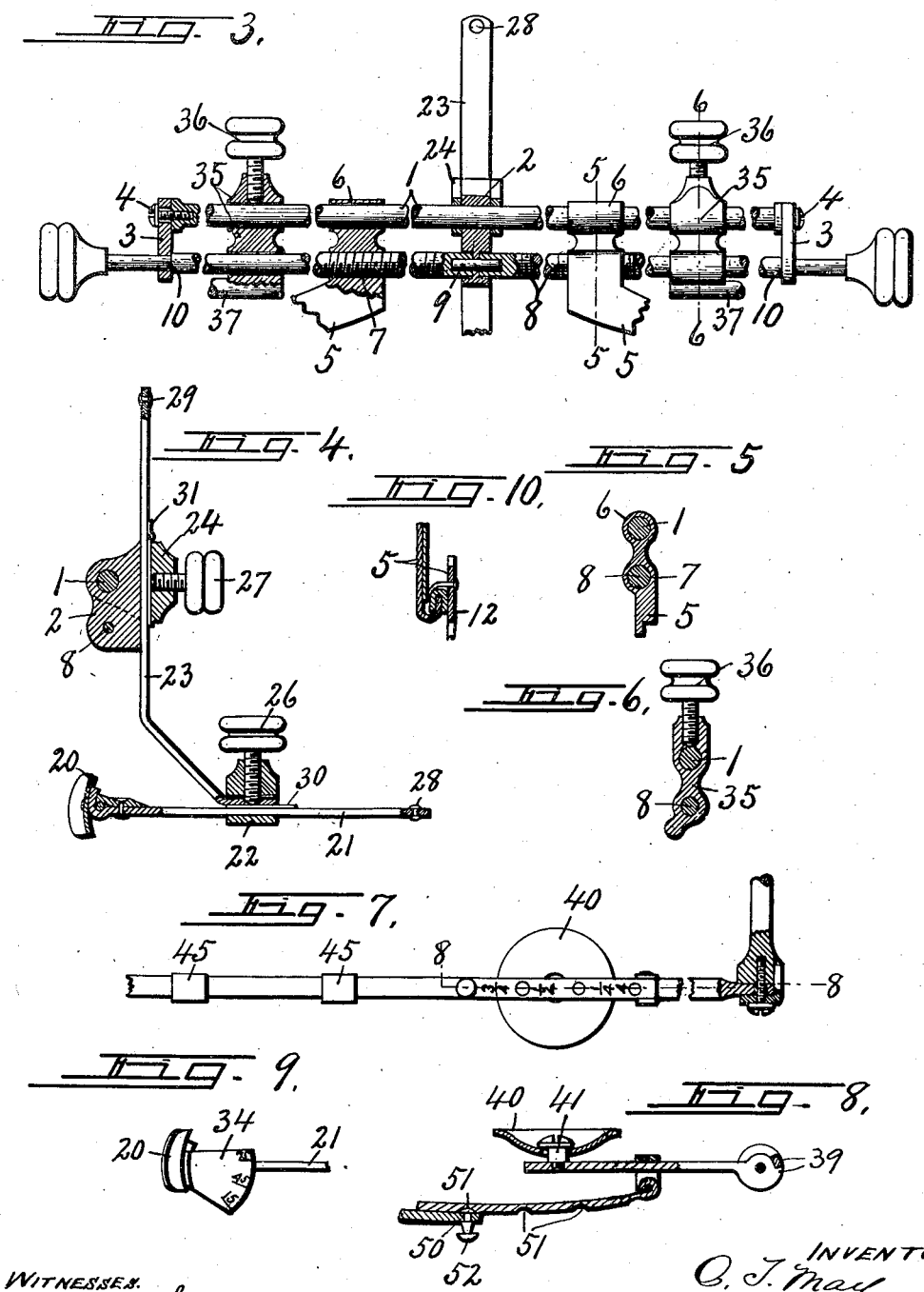

OLIVER T. MAY, OF GENEVA, NEW YORK, ASSIGNOR TO THE STANDARD OPTICAL COMPANY, OF GENEVA, NEW YORK, A CORPORATION OF NEW YORK.

MEASURING DEVICE.

1,200,862.

Specification of Letters Patent. Patented Oct. 10, 1916.

Application filed August 15, 1911. Serial No. 644,212.

*To all whom it may concern:*

Be it known that I, OLIVER T. MAY, of Geneva, in the county of Ontario, in the State of New York, have invented new and useful Improvements in Measuring Devices, of which the following, taken in connection with the accompanying drawings, is a full, clear, and exact description.

This invention relates to certain improvements in trial frames for lenses and although its primary object is to enable opticians, oculists and others skilled in the art to properly fit lenses to the eyes of a patient, the broad purpose is to provide simple means for easily and quickly obtaining accurate facial measurements such as pupilary distances between the eyes and also the relative positions of the temples, back of the ears and bridge of the nose with respect to each other and to the plane of the lenses when properly adjusted to the eyes.

The invention, therefore, contemplates the use of a main supporting frame upon which are mounted suitable gages for accurately adjusting the lenses, nose bridge, temple guards and ear pieces for different facial conditions so that when these parts are once adjusted to any particular patient, a prescription may be made out from the readings of the trial frame and turned over to the optician or manufacturer from which to make or adjust the various parts of eye glasses or spectacles with the assurance that they will fit accurately when worn by the particular individual for whom they were designed.

Other objects and uses will be brought out in the following description.

In drawings, Figures 1 and 2 are respectively a top plan and a front face view of a trial frame embodying the various features of my invention. Fig. 3 is an enlarged longitudinal vertical sectional view, partly in elevation and partly broken away, of the main supporting frame and adjusting screws together with the adjacent portions of the mechanisms mounted thereon. Fig. 4 is an enlarged transverse sectional view through the frame taken on line 4—4, Fig. 1. Figs. 5 and 6 are also transverse sectional views taken respectively on lines 5—5 and 6—6 Fig. 3. Fig. 7 is a side elevation of a portion of one of the bows partly broken away showing the adjacent end of the post to which it is hinged, and also showing one of the temple plates and means for holding the sections of the bow in their adjusted positions. Fig. 8 is a top plan partly in section of the bow, temple guard, and hinge connections shown in Fig. 7. Fig. 9 is a side elevation of the adjustable nose piece and its supporting arm. Fig. 10 is an enlarged transverse sectional view of a portion of the lens holder taken on line 10—10, Fig. 2. Fig. 11 is an inner face view of one of the lens holders.

*Main supporting frame.*—This frame preferably consists of a cylindrical guide rod —1— of non-corrodible or other suitable metal having a central bearing member —2— and opposite end bearing members —3— spaced equi-distantly apart from the central bearing member —2—. These bearing members project laterally to one and the same side of the axis of the guide rod and are rigidly secured thereto by any suitable fastening means, the end pieces —3— being preferably secured in place by screws —4— which are tapped into the adjacent ends of the bar —1— while the central bearing —2— may be brazed or otherwise held upon the bar against turning or axial movement. These bearing members are provided with coaxial apertures some distance to one side of and parallel with the axis of the rod —1— for receiving and supporting suitable adjusting screws forming a part of the lens positioning mechanism or gage presently described.

*Lens positioning mechanism.*—I am aware that certain devices have been provided in lens trial frames for adjusting the lenses simultaneously to and from the nose piece equi-distantly therefrom to conform to the distance between the pupils of the eyes, but it is well known that the relative positions of the facial members of many individuals are more or less irregular or unsymmetrical as in some instances the distances between the pupils and bridge or crest of the nose frequently varies to such an extent as to render the fitting of the glasses practically impossible when positioned equi-distantly from the nose piece, even though the pupilary distance of the lenses may be in exact conformity with that of the eyes of the patient.

The lens positioning mechanism forming one of the important features of my present invention is designed not only to permit the trial lenses to be adjusted a distance practically corresponding with that of the pupilary distance between the eyes of the patient, but also to enable such lenses to be adjusted to different distances relatively to the nose piece and separately from each other so as to conform to any irregularities in the relative positions of the eyes and nose. This mechanism comprises a pair of separately adjustable lens holders —5— having hubs —6— slidably mounted upon the guide rod —1— between the center bearing —2— and end bearings —3— and provided with threaded apertures —7— for receiving the threaded ends of separately rotatable screw spindles —8— as best seen in Figs. 2 and 3. These screw threaded spindles are journaled coaxially end to end in the bearings 2 and 3 and their inner ends are additionally supported in axial alinement by an auxiliary bearing pin —9— which enters suitable sockets therein. The outer ends of these screw spindles are reduced in diameter forming shoulders —10— which engage the inner faces of the bearings —3— to prevent their outward endwise movement and thereby hold their inner ends in the operative position in the center bearing —2—. The extreme outer ends of the reduced portions of the spindle —8— are provided with suitable knobs or finger pieces —11— by which they may be rotated independently of each other. The inner ends of the spindles are screw threaded in opposite directions, forming right and left hand threads so as to adjust the lens holders in opposite directions when t e spindles are rotated in the same direction.

Each lens holder preferably consists of an open circular frame having a rotary lens supporting ring —12— which is provided with suitable lens retainers such as shoulders —13— and —14— located at diametrically opposite sides of the ring, one of which as the shoulder —14— preferably consists of a spring arm for holding the lens against the opposite shoulder —13— thereby permitting the trial lens to be readily inserted and removed or rotated at will to any angle about the axis of the holder.

In order that the positions of the lens holders and lenses mounted thereon relatively to the center bearing or nose piece may be readily ascertained, the guide rod —1— is provided with separate sets of graduations —15— one set at each side of the center bearing —2— the graduations on each side corresponding to the lens holders on that side. The object of these graduations is to enable the operator to determine the distance of the center of the pupil of each eye from the center bearing or crest of the nose so that each lens may be properly fitted to the corresponding eye. In order that this reading may accurately indicate the position of adjustment of the lens holders relative to the center bearing or nose piece, the inner ends of the hubs —6— are provided with suitable pointers —18— as best seen in Fig. —2—.

*Nose gage.*—The lens positioning mechanism thus far described, provides only for the lateral adjustment of the lens-holders to determine the correct distance from the center or nose piece to the center of each of the lens holders, but it is equally important to provide means for properly positioning the trial lens vertically relatively to the crest or bridge of the nose, and for this purpose I have provided the trial frame with a nose piece or rest —20— which may be adjusted in planes substantially parallel with and at right angles to the plane of the lens holder, and is also capable of automatically adjusting itself to the angle of the portion of the nose with which it is adapted to engage or at various angles relatively to the plane of the lens holder.

The nose piece —20— is mounted for vertical rocking movement upon the rear end of a horizontally disposed arm —21— which is slidable back and forth in a suitable retaining post or box —22— on the forwardly offset lower end of a vertically adjustable bar —23— the latter being slidably mounted in a suitable clamp or box —24— on the center bearing —2—.

The bars —21— and —23— are respectively held in position by set screws —26— and —27— as shown more clearly in Fig. —4— and are prevented from accidental displacement from their respective supports by stop shoulders —28— and —29—.

Interposed between the inner ends of each of the set screws —26— and —27— and adjacent faces of the bars —21— and —23— are spring gibs —30— and —31— of hard metal which serve the double purpose of increasing the frictional grip upon the respective parts and also serve as pointers movable along graduations —32— and —33— with which said bars are provided to indicate the position of the nose rest —20— with relation to the axis and vertical plane of the lens holders.

As previously stated, the nose piece or rest —20— is tiltable to different angles relatively to the plane of the lens holders, and preferably consists of a laterally elongated piece of thin sheet metal concaved longitudinally and convexed transversely, said nose piece being hinged upon the adjacent end of the bar —21—, and is provided with suitable means as a graduated sector —34— coacting with the adjacent edge of the bar —21— to indicate its angle of adjustment, thereby determining the angle of the crest or bridge of the nose with which it is engaged.

*Temple gage.*—A pair of separately adjustable heads —35— are slidably mounted upon the guide rod —1— and screw spindle —8— between the heads —18— of the lens holders and end bearings —3—, and are adapted to be held in their adjusted positions by set screws —36—. These heads are provided with outwardly and downwardly curved arms —37— having their lower ends terminating in a horizontal plane substantially coincident with that of the centers of the lens holders for receiving and supporting a pair of temple bars —38— which are hinged thereto to swing inwardly but are limited in their outward swinging movement to a position at right angles to the plane of the lens holders by suitable stops —39— so as to maintain the lens holders in parallelism with the eyes during the testing operation. The rear ends of the bars —38— are provided with self-adjusting temple plates —40— which are preferably cup-shaped or concavo convex in cross section, and are arranged with their open sides facing inwardly and their convex sides swiveled upon suitable studs —41— to tilt freely limited distances in all directions as more clearly shown in Fig. 8. These temple gages are preferably adjusted by hand independently of each other to bring the temple plate —40— into proper contact with the temples.

The inner ends of the heads —35— are provided with suitable pointers —42— which are movable along separate graduations —16— on the adjacent ends of the guide rod —1— to indicate the distance of each of the temple plates —40— from the center bearing or nose piece.

*Ear gages.*—In order that the distances between the plane of the eyes and back of the ears of the same or different individuals may be accurately measured for properly fitting spectacles, I provide the trial frame with extensible ear bows each consisting of separate bars —43— and —44— slidable one upon the other and held in operative relation by one or more (in this instance 2) loops —45—. The bars —43— are hinged at —46— for lateral swinging movement to suitable ears or lugs —47— on the temple bars —38—, and are provided at their extreme outer ends with loops —45— rigid thereon, the inner loops —45— being secured to the bars —44—. These bars —44— with their loops —45— are slidable lengthwise of and upon the bars —43— and through the outer end loops —45— thereon, and are adapted to be held in their adjusted positions by suitable detents consisting in this instance of projections —50— on the inner ends of the bars —44— adapted to be spring pressed under the tension of the bar —44— into suitable recesses —51— in the adjacent faces of the bars —43— as best seen in Fig. 8.

The projection —50— preferably consists of the head of a rivet secured to the bar —44— and provided with an outwardly projecting knob or finger piece —52— whereby this end of the bar may be sprung outwardly by hand to disengage the projections —50— from the recesses —51— and permit the bars —44— to be moved endwise. The extreme outer ends of the bars —44— are preferably hook-shaped or made in the form of open loops to readily interfit with the back of the ears.

As best seen in Fig. —7—, the outer faces of the bars —43— are provided with lengthwise graduations adapted to register with the adjacent ends of the bars —44— to indicate the distance or position of the loops or ear engaging portions of the bars —44— relatively to the plane of the lenses. In operation the trial lenses may be placed on the stationary or revoluble portions of the lens holders and the latter adjusted bodily by means of the screws —8— until brought into conformity with the pupilary distance between the eyes, the nose piece —20— being also adjusted by means of the bars —21— and —23— until the axes of the lens holders are brought to the desired horizontal plane co-incident with the centers of the pupils of the eyes. During this part of the adjustment the nose piece by reason of its ability to readily change angle conforms to the angle of the crest or bridge of the nose, such angle being indicated by the graduations on the sector —34—. In like manner the position of each of the lens holders relatively to the nose piece is indicated by the graduations on the guide rod —1—, the upright bar —23— being also graduated to indicate the position of the crest of the nose above or below a direct line between the centers of the pupils of the eyes while the horizontal bar —21'— is similarly graduated to indicate the position of the crest of the nose relative to the vertical plane of the eyes.

When the trial lenses are mounted in the rotary sections of the lens holders, with their optical axes in predetermined positions relative thereto, such sections may be rotated by hand to properly adjust the lenses to the eyes, the degree of adjustment being indicated by suitable graduation on the stationary sections of the lens holders as shown in Fig. 2, said rotary sections being held in their adjusted positions by detents —56— which are also movable by hand into and out of operative engagement with notches in the periphery of the rotary section. It will now be clear upon reference to the foregoing description taken in connection with the drawings that this trial frame is adapted to give accurate facial measurements showing relative positions of the eyes, bridge or crest of the nose, temples and ears, so that when the various parts of the trial frame are adjusted to properly position the lenses relative to the eyes, the readings may be taken from the frame and the prescription filled out whereby the eye glasses or spectacles may be made and adjusted to accurately fit the face and eyes of the user. But it is evident that various parts of the trial frame may be somewhat modified without departing from the spirit of this invention.

For the purpose of adjusting the optical axes of the lenses to the eye, the degree of such adjustment is indicated by suitable graduations on the stationary portions of the lens holders.

What I claim is:—

1. In a measuring device of the character described, a frame having a horizontal guide rod, a bearing member centrally mounted on the rod, a bar adjustable vertically on the bearing member with relation to the guide rod, means for clamping the bar in its adjusted position, an arm adjustable transversely of the plane of adjustment of said bar, means for clamping the arm to the bar, and a nose-piece swiveled to one end of said arm.

2. In a measuring device of the character described, a frame having a vertical guide, a bar adjustable vertically in the guide, means for holding the bar in its adjusted position, a horizontal guide on the lower end of the bar, an arm adjustable horizontally in the last-named guide, separate means for clamping said arm in its adjusted position, a nose-piece hinged to the rear end of the arm to conform to the angle of the crest of the nose, and a graduated plate on the nose-piece movable relatively to the adjacent end of said arm to indicate the angle of adjustment of the nose-piece.

3. In a measuring device of the character described, a frame having a guide rod, a nose-measuring device thereon, optic-measuring devices slidable on the rod at opposite sides of the nose-measuring device, and temple-measuring devices also slidable on the rod at the outer sides of the optic-measuring devices, said rod having separate scales for measuring the distances of the optic and temple-measuring devices from the nose-measuring device.

4. In a measuring device of the character described, a frame having a guide rod, a nose-measuring device thereon comprising a horizontal arm and a nose-rest hinged thereto and provided with a graduated sector co-acting with the bar to indicate the angle of adjustment of the nose-rest.

5. In a measuring device of the character described, a frame having a guide rod, and separate temple-measuring devices slidable thereon and provided with swiveled temple plates.

In witness whereof I have hereunto set my hand this 17 day of July, 1911.

OLIVER T. MAY.

Witnesses:
F. J. WIRTZ,
W. W. PAGE.